(12) United States Patent
Rhodes et al.

(10) Patent No.: US 6,535,528 B1
(45) Date of Patent: Mar. 18, 2003

(54) DS256 SYNCHRONOUS DIGITAL INTERFACE

(75) Inventors: Steven J. Rhodes, Nepean (CA); Yvon J-C. Deguire, Cumberland (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/268,383

(22) Filed: Mar. 15, 1999

(51) Int. Cl.[7] .................................................. H04J 3/06
(52) U.S. Cl. ........................................ 370/517; 370/463
(58) Field of Search ................................ 370/517, 463, 370/518, 519, 520, 503, 516, 249, 284, 301, 350, 351, 352, 375, 389, 395.1, 400, 401; 379/399.01

(56) References Cited

U.S. PATENT DOCUMENTS

| | | | | |
|---|---|---|---|---|
| 5,390,351 A | * | 2/1995 | De Giulio et al. | 709/225 |
| 5,742,608 A | * | 4/1998 | Randrianaliminana et al. | 370/447 |
| 5,808,487 A | * | 9/1998 | Roy | 327/55 |
| 5,949,253 A | * | 9/1999 | Bridgewater | 326/86 |
| 6,208,654 B1 | * | 3/2001 | Moteki et al. | 370/395.2 |
| 6,298,133 B1 | * | 10/2001 | Hein et al. | 379/399.1 |

* cited by examiner

*Primary Examiner*—Douglas Olms
*Assistant Examiner*—Brian Nguyen
(74) *Attorney, Agent, or Firm*—Gibbons, Del Deo, Dolan, Griffinger & Vecchione

(57) ABSTRACT

The invention relates to methods and apparatus for synchronously digital interfacing communications components. The apparatus includes a device configured to transmit and receive differential signals. One set of differential signals includes a transmit signal and a receive signal, and another set of differential signals includes a clock signal and a synchronization signal. The combination of clock signals and synchronization signals form other signals having a variable period. The other signals are used to modify the set of differential signals including transmit and receive signals.

38 Claims, 4 Drawing Sheets

DS256 SYNCHRONOUS DIGITAL INTERFACE

FIELD OF THE INVENTION

This invention relates generally to communications networks and, more particularly, to synchronous digital interfaces for connecting communications components in communications networks.

BACKGROUND

A communications system may be created by connecting various communication components such as servers, timeswitches, hubs, and data processing modules. Multiple communications systems connected together form a communications network. Many communications systems include a media services card (MSC); a personal computer (PC) card that performs call processing and media processing of voice channels in the network. The MSC can also be the central interconnect location of a communications network. It accomplishes this task by handling time switching of synchronous channels and interworking with other components in the communications network.

FIG. 1 shows a conventional communications network with a MSC 20 connected to a server 10, and shows the MSC connected to other communications equipment via a synchronous interface 40. A MSC can also include a hub 50, timeswitch 60, media service component 70, and other modules 30. In addition, a MSC can be connected to central units, such as servers 10, via a slot in a PC (e.g. Peripheral Component Interconnect standard (PCI 2.1) slot). This allows interfacing with the server processor and other peripherals used in a communication system. Data packets may be transmitted between the MSC 20 and the server 10, other internal modules 30, or external modules and systems, thereby creating the communications network.

FIG. 1 also shows the MSC card connected to an expansion chassis 80 via an interconnection 40. The interconnections between them can be used for trunk and line connections. Trunk and line interfaces provide access to telecommunications trunks and station set lines. Trunk and station set lines can include Caller ID Analog Trunk interfaces, T1/E1/PRI trunk with channel service unit interfaces, and Analog and Digital phone interfaces. These interfaces are the conduits that pass information throughout the network.

FIG. 2 shows a communications network architecture (with the servers not shown). The network is physically arranged as a branched tree, with a timeswitch 200 at the root and modules 210 as the end nodes. Intermediate nodes are called hubs 220. This physical arrangement allows for point-to-point links at all interfaces. The systems and methods of interfacing between the devices are important components of communications systems and networks. As systems and networks grow, the interfaces handle greater amounts of data and connect to more devices. Present interfaces, however, are substantially limited in channel capacity, expansion capabilities, and the like.

There are many electrical synchronous interfaces available, however, these existing electrical synchronous interfaces are slow and limited in capacity. Those that are expandable are expensive, impractical (e.g. must cascade multiple interface cards), suffer from speed limitations, are electrically noisy, prone to interference from outside sources, and lack features such as maintenance signaling and automatic propagation delay calibration and compensation.

Fiber-optic interfaces have been used as synchronous digital interfaces. However, fiber-optic interfaces are more expensive to implement and are much less common than electrical interfaces.

Accordingly there exists a need for systems and methods of synchronous digital interfacing that efficiently use existing wiring schemes.

There also exists a need for systems and methods of synchronous digital interfacing that do not require a clock source or sensitive clock recovery circuit in the peripherals in order to use the interface.

There also exists a need for systems and methods of synchronous digital interfacing that efficiently support multiple peripheral devices.

There also exists a need for systems and methods of synchronous digital interfacing that improve immunity to radio frequency interference (RFI).

There also exists a need for systems and methods of synchronous digital interfacing that reduce RF emissions.

There also exists a need for systems and methods of synchronous digital interfacing that allow for network synchronization control in the peripherals.

There also exists a need for systems and methods of synchronous digital interfacing that support automatic configuration.

There also exists a need for systems and methods of synchronous digital interfacing that support multiple cable lengths.

There also exists a need for systems and methods of synchronous digital interfacing that allow for insertion and removal of powered peripheral devices onto the network without disrupting the network.

There also exists a need for systems and methods of synchronous digital interfacing that interwork with an existing flow-controlled message transport without using any dedicated signaling bandwidth.

Accordingly, it is an object of the present invention to provide systems and methods of synchronous digital interfacing that efficiently uses existing wiring schemes.

It is also an object of the present invention to provide of synchronous digital interfacing that do not require a clock source or sensitive clock recovery circuit in the peripherals in order to use the interface.

It is also an object of the present invention to provide systems and methods of synchronous digital interfacing that efficiently support multiple peripheral devices.

It is also an object of the present invention to provide systems and methods of synchronous digital interfacing that improve immunity to RFI.

It is also an object of the present invention to provide systems and methods of synchronous digital interfacing that reduce RF emissions.

It is also an object of the present invention to provide systems and methods of synchronous digital interfacing that allow for network synchronization control in the peripherals.

It is also an object of the present invention to provide systems and methods of synchronous digital interfacing that support automatic configuration.

It is also an object of the present invention to provide systems and methods of synchronous digital interfacing that are usable with different cable types.

It is also an object of the present invention to provide systems and methods of synchronous digital interfacing that support multiple cable lengths.

It is also an object of the present invention to provide systems and methods of synchronous digital interfacing that allow for insertion and removal of powered peripheral devices without disrupting a network.

It is also an object of the present invention to provide systems and methods of synchronous digital interfacing that interwork with an existing flow-controlled message transport without using any dedicated signaling bandwidth.

These and other objects of the invention will become apparent to those skilled in the art from the following description thereof.

SUMMARY OF THE INVENTION

In accordance with the teachings of the present invention, these and other objects may be accomplished by the present invention, which is a synchronous digital interface for connecting components in a communications network.

An embodiment of the invention includes a device configured to transmit and receive differential signals. One set of the differential signals includes a transmit signal and a receive signal. A second set of the differential signals includes a clock signal and a synchronization signal. Combinations of the clock signal and the synchronization signal form other signals having variable periods. The other signals can be used to modify the first set of differential signals.

Another embodiment of the present invention includes a method of synchronously digitally interfacing components in a communications network. This embodiment involves transmitting and receiving differential signals. A first set of differential signals includes a transmit signal and a receive signal. A second set of differential signals includes a clock signal and a synchronization signal. This embodiment also includes forming other signals having variable periods by combining the clock signal and the synchronization signal. This embodiment further includes modifying the first set of differential signals using the other signals.

Another embodiment of the present invention includes a transmission module for transmitting and receiving differential signals. A first set of differential signal includes a transmit signal and a receive signal. A second set of differential signals includes a clock signal and a synchronization signal. It includes a module for combining the clock signal and the synchronization signal to form other signals having variable periods. The other signals are used to modify the first set of differential signals.

DESCRIPTION OF THE DRAWINGS

The invention will be more clearly understood by reference to the following detailed description of an exemplary embodiment in conjunction with the accompanying drawings, in which.

DETAILED DESCRIPTION OF THE INVENTION

This invention provides an interface between components in communications systems and/or networks. It provides a new method of signaling between the components in the network and provides added network maintenance messaging without interfering with the communications data.

Figure 3:
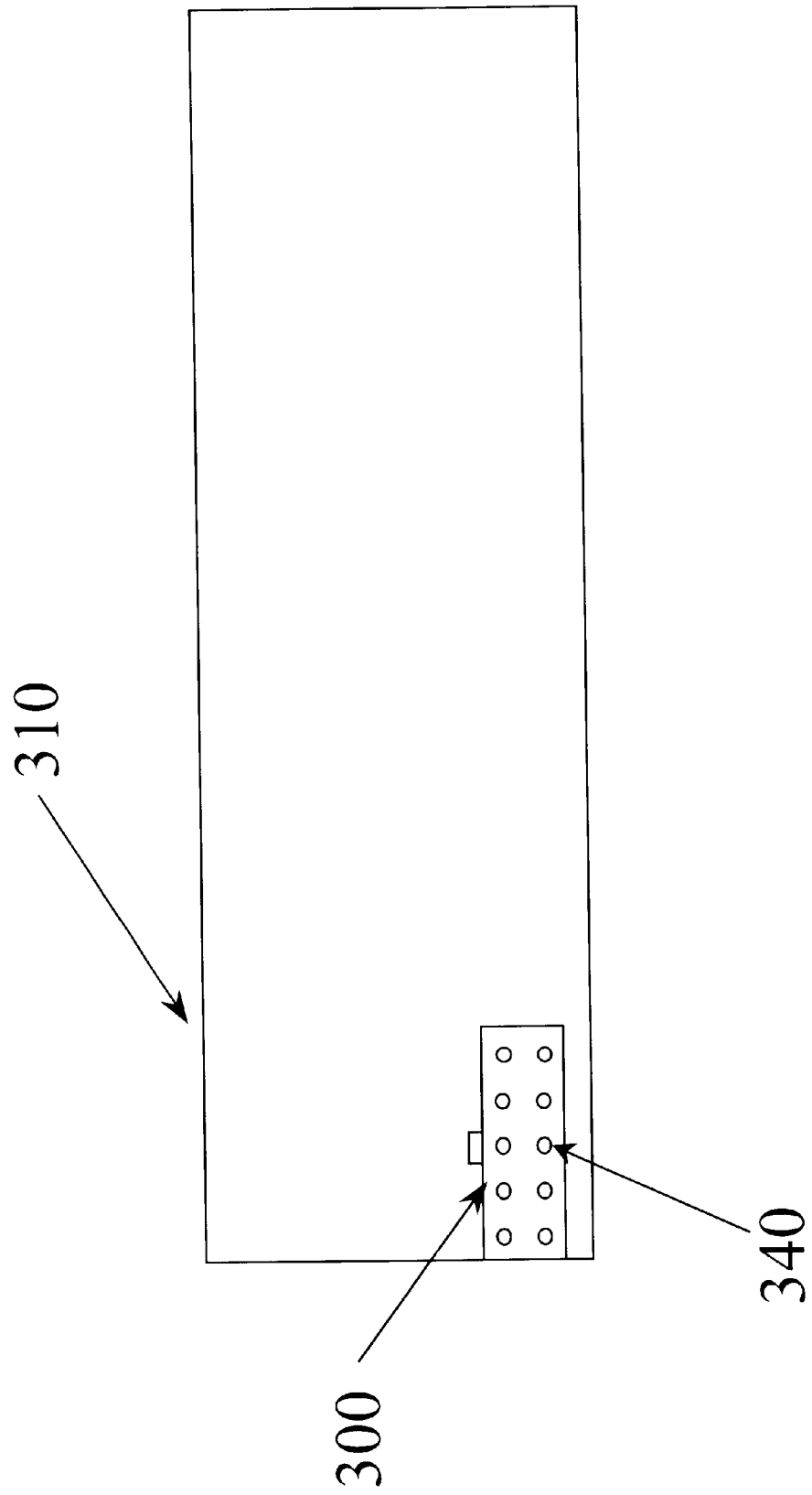
FIG. 3 is an embodiment of the mechanical aspect of the present invention.

FIG. 3 is an embodiment of the electro/mechanical aspect of the present invention showing the rear view of a communications module 310 with the present invention 300 connected to the module. The present invention can include a 2×5-pin connector 300 mounted on the rear edge of the module 310, thereby permitting blind mating to a computer chassis. In addition, one pair of pins 340 on connector 300 may be shorted together, to provide an indication that a module is properly seated in a PC chassis. This indication may be used to control power soft-start circuitry and module initialization. Those skilled in the art will realize that logic signals may be used instead of the shorting link to provide the same indication.

A modular jack (not shown) can be included for connection to an expansion chassis. This provides a way of expanding the system via the front or rear plate of the PC. Additional jacks may be added, thus making the interfaces on an intermediate device electrically separate, operating as a point-to-point link to the next intermediate device or peripheral device.

The mechanical design of the present invention can also be made to support hot insertion and front-only installation and removal. Such aspects ease installation since it does not require disassembly of the chassis and system power-downs.

Figure 4:
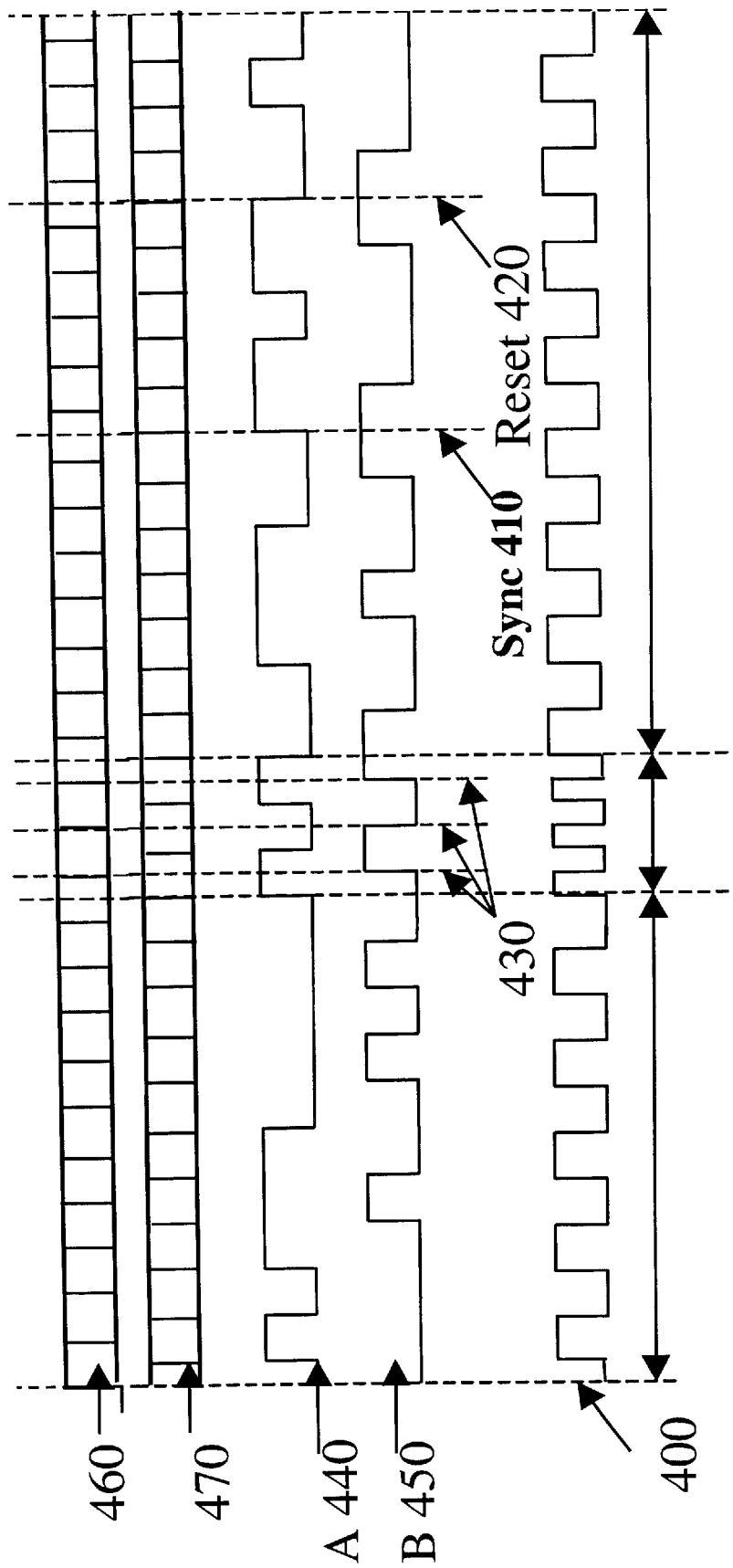
FIG. 4 is a timing diagram of the present invention.

FIG. 4 is a timing diagram of the present invention. An embodiment of the present invention includes four signals which may be sent across twisted-pair, ribbon cable, and the like. One pair of signals may be used for encoding transmit (Tx) 460 and receive (Rx) 470 signals (i.e. data lines). And the other pair of signals (hereinafter called A signal 440 and B signal 450) may be used to encode other signals, such as a system clock, reset, synchronization and extra edges (i.e. extra bit transitions). By combining A signal 440 with B signal 450 this invention can extract a frame synchronization signal 410, reset signal 420 and a system clock signal 400. Each pair of signals may be transmitted using differential transmission. This will minimize electromagnetic interference (EMI) and maximize immunity to radio frequency interference (RFI).

A signal 440 and B signal 450 are also encoded to reduce the maximum RF energy (i.e. RF emissions) by randomizing the distribution of transitions on the A signal 440 and B signal 450. This reduces the RF spectrum in relation to a pure clock on either A signal 440 or B signal 450. A signal 440 exclusive OR'ed (XOR) with B signal 450 will yield a system clock signal 400 with edges centered in the Tx bit period. The Rx 470 bit period is clocked on an edge of the system clock signal 400. If A signal 440 transitions high or low while B signal 450 is low, the resulting output of the XOR is a system clock signal 400. When A signal 440 transitions high while B signal 450 is high the result is a system clock 400 and frame synchronization signal 410. If A signal 440 transitions low, while B signal 450 is high then the resulting signals are a system clock 400 and a reset signal 420. Those skilled in the art will realize that other logic devices can be used to combine the A signal 440 and B signal 450, and still be within the scope of this invention.

Other simple codings of A signal 440 and B signal 450 are possible. The system clock signal is positioned to sample Tx 460, but does not modify Tx bits being forwarded by a device (e.g. bits being forwarded downstream by a hub). It is desirable to modify some Tx data bits for the purpose of maintenance or other messaging. To correctly time changes to the Tx bits, additional clock transitions 430 (i.e. extra edges) can be added to the A signal 440 and/or B signal 450. The extra transitions therefore allow a bit (or bits) in the Tx signal 460 to be modified before a receiver clocks the Rx 470 period. The Tx signal 460 can thus be used to carry a messaging signal which can be modified anywhere in the network.

Maintenance signals can include temperature monitoring, port monitoring, port identification, system identification, and the like. Intermediate devices can also arbitrate access to a common maintenance signaling channel using flow-control routing.

Figure 1:
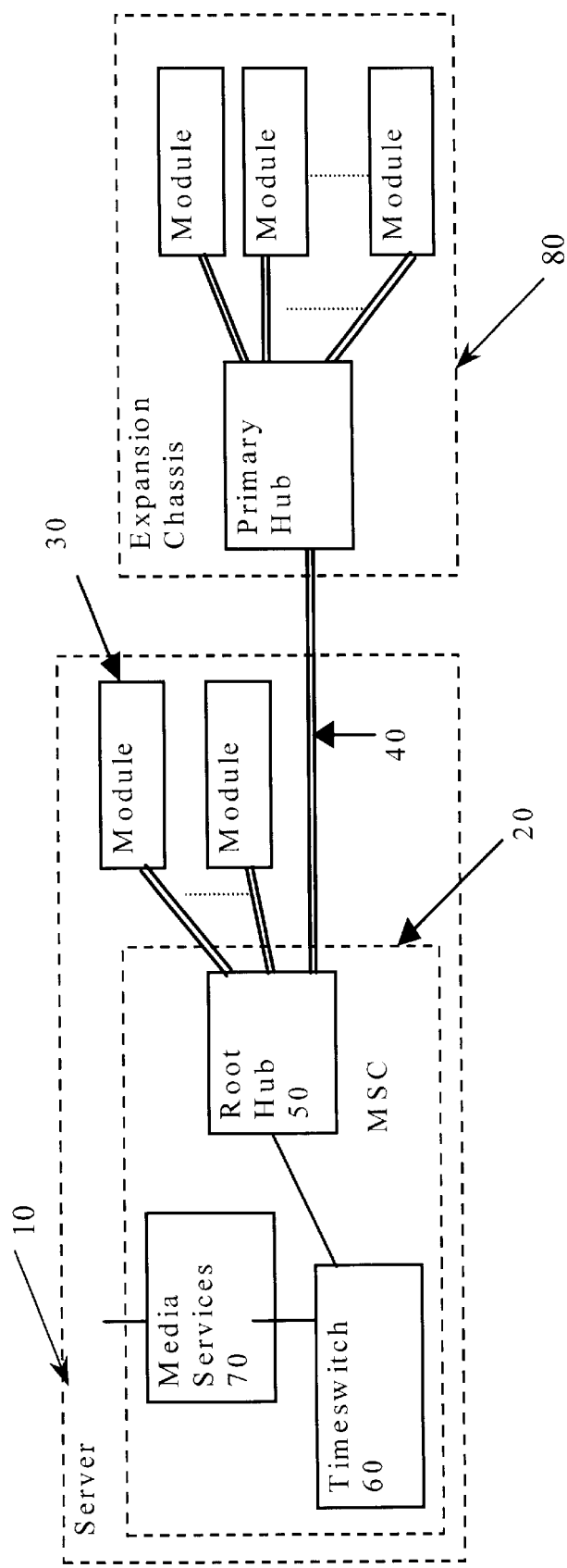
FIG. 1 is a block diagram of a conventional communications system.
Figure 2:
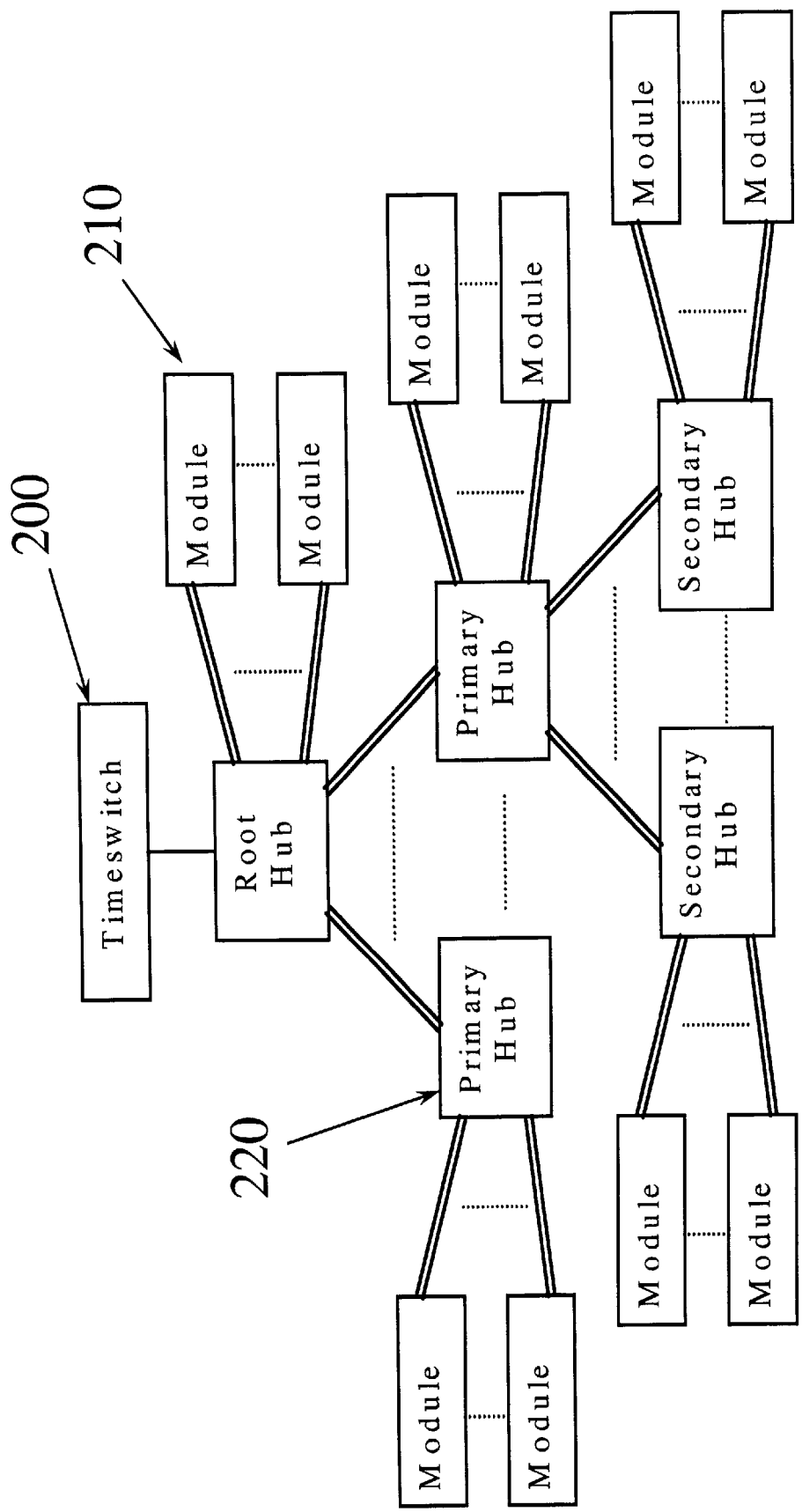
FIG. 2 is a block diagram of a network physically arranged as a branched tree.

Since a frame sync 410 identifies the beginning of a data frame, this invention can distinguish the extra signaling transitions 430 from the rest of the system clock 400 transitions without compromising the data packets used for network communications. Thus, data signals 460 may originate from an upstream device (i.e. a device up higher in the hierarchy of the branched network) and seamlessly travel downstream to a hub or module. Conversely, this invention allows a downstream device (i.e. component located anywhere below the root device of the branched network) to alter the Tx 460 data at specific times and send the new data without affecting other data in the data frame. For example, intermediate devices, such as a primary hub (i.e. between the peripheral devices (modules) and the timeswitch) as shown in FIG. 2 can broadcast, via this invention, information from the timeswitch without sampling A signal 440, B signal 450 or Tx signal 460 and send the information downstream with modified or unmodified messaging data. In addition, data moving upstream can come from downstream or be sourced within a device (e.g. hub) at any time. The intermediate device, via this invention, can also merge information from multiple peripheral devices and send the information upstream.

Maintenance signaling can be accomplished by encoding extra clock edges with the clock signals (e.g. temporarily speeding up the clock) by increasing the frequency and/or modifying the phase of B signal 450. The clock can be recovered from the A signal 440 during the maintenance-signaling period when there are extra edges on B signal 450. If the receiver is unsynchronized and therefore does not know when the maintenance-signaling period occurs, it can tolerate the (momentarily) faster clock resulting from A signal 440 XOR B signal 450. Furthermore, reset signals can be ignored during the maintenance-signaling period when there are extra edges on the B signal. If the receiver is unsynchronized and therefore does not know when the maintenance-signaling period occurs, it can accept all resets. In other words, the extra transitions of B signal 450 are not necessary for synchronization indications.

Merging upstream data may include OR'ing all of the downstream Rx signals 470 received by the intermediate device and forwarding the signals upstream. Merging can also be accomplished by determining which port is sending active Rx data 470 and forwarding more specific Rx data 470 upstream.

This invention can also insert delays to compensate for the propagation delays inherent in the communications network devices. In addition, this invention can calculate the propagation delay of a cable in the system using an adaptive cable measurement and data signal loop back. Accordingly, this invention can automatically insert corresponding delays.

This invention also provides a unique serial number for identifying the peripheral devices. This allows an upstream device to monitor all of the devices in the communications network. By using this circuitry, this invention can autonomously generate error messages as necessary, with sufficient information to allow stateless error handling. For example, the present invention may include interface circuitry for monitoring and controlling of devices such as a electronic thermometer and cooling fan, respectively. If a system component's temperature becomes too high, the device can send a maintenance alarm message. Those skilled in the art will realize that other more complex measurement and control situations can be handled, such as re-routing due to a downed device, security monitoring and counter measures that protect against system breach, etc.

In addition, the upstream device can monitor which ports of downstream devices are in use. This provides value by allowing for fast and automatic identification and service to peripherals.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A synchronous digital interface for connecting components in a communications network, comprising:
a device configured to transmit and receive a plurality of differential signals, wherein a first set of said differential signals includes a transmit signal and a receive signal, and wherein a second set of said differential signals includes a clock signal and a synchronization signal; and
wherein combinations of said clock signal and said synchronization signal form a plurality of other signals having a variable period, said plurality of other signals being used to modify said first set of said differential signals by performance of a task selected from a group consisting of encoding extra clock edges with the clock signal, increasing frequency and altering phase.

2. A synchronous digital interface according to claim 1, wherein said variable period is determined by varying an aspect of at least one of said second set of said differential signals.

3. A synchronous digital interface according to claim 2, wherein said aspect comprises a frequency.

4. A synchronous digital interface according to claim 2, wherein said aspect comprises a phase.

5. A synchronous digital interface according to claim 1, further comprising:
a logic device configured to receive said clock signal and said synchronization signal and configured to gate said clock signal and said synchronization signal.

6. A synchronous digital interface according to claim 5, further comprising:
a logic device configured to receive said clock signal and said synchronization signal and configured to exclusive OR said clock signal and said synchronization signal.

7. A synchronous digital interface as described in claim 1, wherein said plurality of other signals further comprise:
a system clock signal;
another synchronization signal; and
a reset signal.

8. A synchronous digital interface according to claim 1, further comprising:
   a second device;
   a plurality of wires electrically coupled between said device and said second device wherein one of said differential signals are carried over said plurality of wires;
   wherein said second device is configured to loop back one of said differential signals carried on said plurality of wires;
   a calibration unit electrically coupled to said device, configured to calculate a propagation delay of said plurality of wires; and
   a delay unit electrically coupled to said device, configured to delay a transmission from said device for a period of time based upon said propagation delay.

9. A synchronous digital interface according to claim 1, wherein said device further comprises:
   a delay unit electrically coupled to said device, configured to delay a transmission from said device.

10. A synchronous digital interface according to claim 1, further comprising:
    an analog trunk electrically coupled to said device.

11. A synchronous digital interface according to claim 1, further comprising:
    a digital trunk electrically coupled to said device.

12. A synchronous digital interface according to claim 1, further comprising:
    an analog phone electrically coupled to said device.

13. A synchronous digital interface according to claim 1, further comprising:
    a digital phone electrically coupled to said device.

14. A synchronous digital interface according to claim 1, further comprising:
    a plurality of station set lines electrically coupled to said device.

15. A synchronous digital interface according to claim 1, further comprising:
    a hub electrically coupled to said device.

16. A synchronous digital interface according to claim 1, further comprising:
    a timeswitch electrically coupled to said device.

17. A synchronous digital interface according to claim 1, wherein said device is a media service card.

18. A synchronous digital interface according to claim 1, wherein said device is a data processing module.

19. A synchronous digital interface according to claim 1, further comprising:
    a serial number identification, wherein said serial number identification is communicated throughout said communications network.

20. A synchronous digital interface according to claim 1, wherein said device includes a plurality of ports electrically coupled to said device, wherein said ports have an identification associated therewith, and wherein said identification is communicated throughout said communications network.

21. A synchronous digital interface according to claim 1, wherein: said device has a connector electrically coupled to a computer backplane; and
    an indication unit configured to indicate one of said components seated into said computer backplane.

22. A method of synchronously digitally interfacing components in a communications network, comprising:
    transmitting and receiving a plurality of differential signals, wherein a first set of said differential signals includes a transmit signal and a receive signal, and wherein a second set of said differential signals includes a clock signal and a synchronization signal;
    combining said clock signal and said synchronization signal to form a plurality of other signals;
    varying a period of one of said second set of said differential signals; and
    modifying one of said first set of said differential signals using one of said plurality of other signals, the modifying being selected from a group consisting of encoding extra clock edges with the clock signal, increasing frequency and altering phase.

23. A method synchronously digitally interfacing according to claim 22, further comprising:
    varying said period by varying an aspect of one of said second set of said differential signals.

24. A method synchronously digitally interfacing according to claim 23, further comprising:
    wherein said aspect is frequency.

25. A method synchronously digitally interfacing according to claim 23, further comprising:
    wherein said aspect is phase.

26. A method according to claim 22, further comprising:
    combining said clock signal and said synchronization signal during a first period to form a system clock signal;
    combining said clock signal and said synchronization signal during a second period to form another synchronization signal; and
    combining said clock signal and said synchronization signal during a third period to form a reset signal.

27. A method according to claim 22, further comprising:
    transmitting and receiving said differential signals via a plurality of wires;
    calculating a propagation delay of one of said plurality of wires; and
    delaying one of said differential signals using said calculated propagation delay.

28. A method according to claim 22, further comprising:
    delaying ones of said differential signals.

29. A method according to claim 22, further comprising:
    identifying said components with a serial number; and
    communicating said serial number throughout said communications network.

30. A method according to claim 22, further comprising:
    identifying said components electrically coupled to said device according to said coupling; and
    communicating said identification throughout said communications network.

31. A method according to claim 22, further comprising:
    determining properly seated components; and
    initializing said components if seated.

32. An apparatus for connecting components in a communications network, comprising:
    means for transmitting and receiving a plurality of differential signals, wherein a first set of said differential signals includes a transmit signal and a receive signal, wherein a second set of said differential signals includes a clock signal and a synchronization signal;
    means for combining said clock signal and said synchronization signal to form a plurality of other signals having a variable period; and
    means for modifying one of said first set of said differential signals using one of said plurality of other signals by performing a task selected from a group consisting of encoding extra clock edges with the clock signal, increasing frequency and altering phase.

33. A synchronous digital interface according to claim 32, further comprising means for varying said variable period.

34. An apparatus according to claim 32, wherein said other signals further comprise:

a system clock signal;

another synchronization signal; and a reset signal.

35. An apparatus according to claim 32, further comprising, conduit means for carrying said differential signals; and calibration means electrically coupled to said conduit means, for calculating a propagation delay of said conduit means; and delay means for delaying a transmission from said means for transmitting and receiving for a period of time based upon said propagation delay.

36. An apparatus according to claim 32, further comprising:

delay means for delaying a transmission from said means for transmitting and receiving.

37. An apparatus according to claim 32, further comprising:

identification means for identifying said means for transmitting and receiving; and communications means for communicating an identification from said identification means throughout said communications network.

38. An apparatus according to claim 32, wherein:

said means for transmitting and receiving has a connector electrically coupled to a computer backplane;

said apparatus further comprising indication means for indicating one of said components seated into said computer backplane.

* * * * *